(12) United States Patent
Cai et al.

(10) Patent No.: US 10,216,211 B2
(45) Date of Patent: Feb. 26, 2019

(54) CONTROL METHOD AND CONTROL CIRCUIT FOR VOLTAGE SWITCH CIRCUIT AND USB POWER DELIVERY

(71) Applicant: Silergy Semiconductor Technology (Hangzhou) LTD, Hangzhou, ZheJiang Province (CN)

(72) Inventors: Yongbin Cai, Hangzhou (CN); Junjie Li, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 0 days.

(21) Appl. No.: 15/644,371

(22) Filed: Jul. 7, 2017

(65) Prior Publication Data

US 2018/0019673 A1 Jan. 18, 2018

(30) Foreign Application Priority Data

Jul. 15, 2016 (CN) .......................... 2016 1 0559721

(51) Int. Cl.
*G05F 1/59* (2006.01)
*H02M 3/158* (2006.01)
*H02M 1/088* (2006.01)
*H02J 1/00* (2006.01)
*H02M 1/00* (2006.01)

(52) U.S. Cl.
CPC .............. *G05F 1/59* (2013.01); *H02M 1/088* (2013.01); *H02M 3/158* (2013.01); *H02M 3/1584* (2013.01); *H02J 1/00* (2013.01); *H02J 2001/008* (2013.01); *H02M 2001/0045* (2013.01)

(58) Field of Classification Search
CPC .... H02J 3/38; H02J 9/04; H02J 7/0024; H02J 3/14; H02J 2003/388; Y10T 307/696; Y10T 307/702; Y10T 307/74; Y10T 307/453; Y10T 307/747; Y10T 307/76; H03K 17/00; H03K 2217/0036; Y02B 70/3225; H01H 2300/018
USPC .................. 307/43, 64–66, 80, 81, 112, 113, 307/115–116, 125
See application file for complete search history.

(56) References Cited

U.S. PATENT DOCUMENTS

| | | | | |
|---|---|---|---|---|
| 6,130,813 A | * | 10/2000 | Kates | H02H 9/001 307/80 |
| 6,459,171 B1 | * | 10/2002 | Leifer | H02J 1/10 307/24 |
| 8,067,925 B2 | | 11/2011 | Grimm | |
| 9,130,456 B2 | | 9/2015 | Yu et al. | |
| 9,317,019 B2 | | 4/2016 | Huang | |
| 9,331,522 B2 | * | 5/2016 | Lin | H02J 1/102 |
| 2013/0148387 A1 | | 6/2013 | Ren et al. | |

* cited by examiner

*Primary Examiner* — Nguyen Tran
(74) *Attorney, Agent, or Firm* — Michael C. Stephens, Jr.

(57) ABSTRACT

A method of controlling a voltage switch circuit can include: controlling an output voltage of the voltage switch circuit to be switched from a first voltage input to a first switch circuit to a second voltage input to a second switch circuit to be no larger than a smaller one of the first and second voltages before the second switch circuit starts conducting; switching the output voltage to the second voltage when the second switch circuit starts conducting, where outputs of the first and second switch circuits are coupled together to provide the output voltage; and controlling the first switch circuit to turn off after the second switch circuit conducts and when the output voltage is no larger than the smaller one of the first and second voltages.

14 Claims, 7 Drawing Sheets

US 10,216,211 B2

CONTROL METHOD AND CONTROL CIRCUIT FOR VOLTAGE SWITCH CIRCUIT AND USB POWER DELIVERY

RELATED APPLICATIONS

This application claims the benefit of Chinese Patent Application No. 201610559721.5, filed on Jul. 15, 2016, which is incorporated herein by reference in its entirety.

FIELD OF THE INVENTION

The present invention generally relates to the field of power electronics, and more particularly to control methods and circuits for a voltage switch circuit and USB power delivery.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Voltage switch circuits can switch an output voltage between various input voltage sources, such as may be provided by switch mode power supplies.

DETAILED DESCRIPTION

Figure 1:
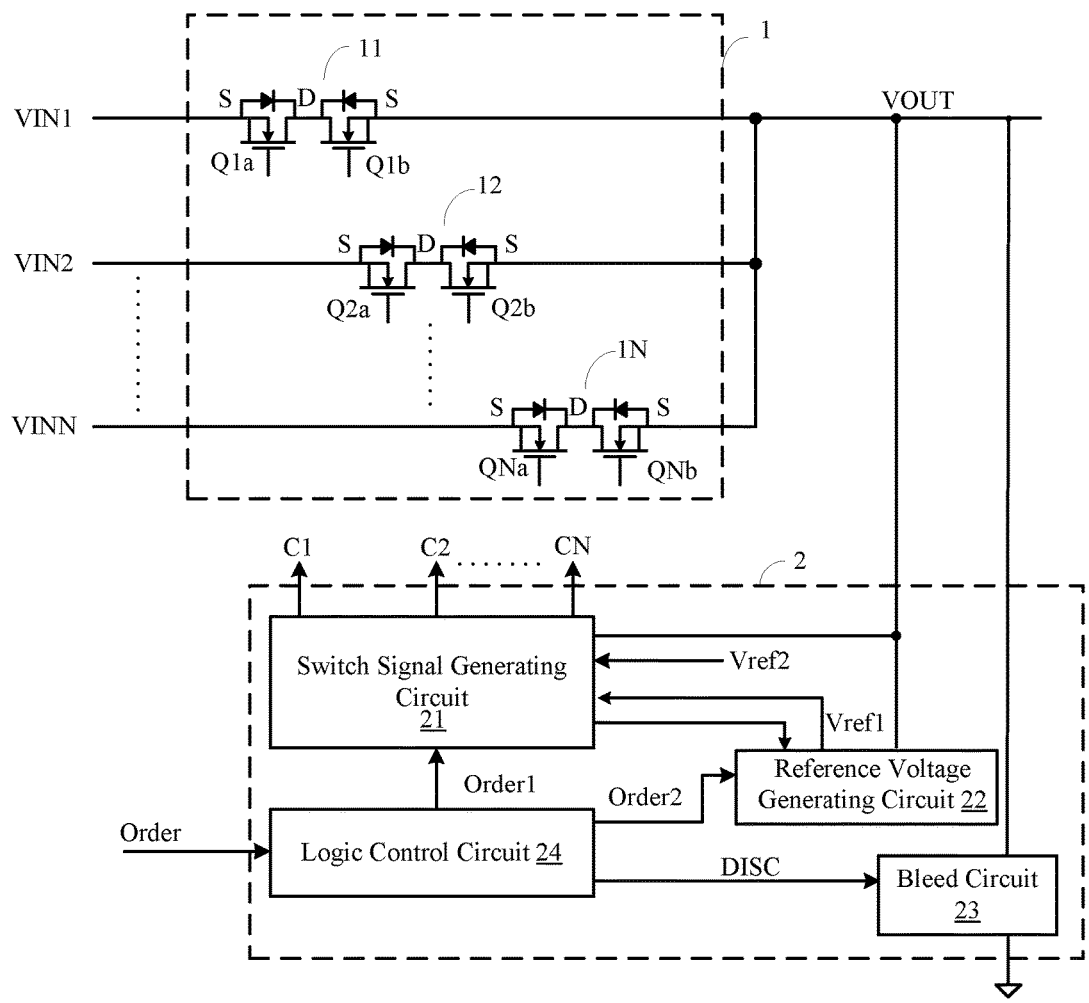
FIG. 1 is a schematic block diagram of a first example voltage switch circuit, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In some multi-input single-output applications, an appropriate output voltage may be obtained by switching between different input power supplies. In one example, a diode may be placed between each input terminal and each output terminal, and the switch operation between different inputs can be performed based on the unidirectional conductive characteristic of the diode. However, relatively large power losses may be generated in a relatively large load current condition due to the diode voltage drop between the output voltage and an input voltage during normal operation. As a result, this approach may not be suitable for applications having high precision or heavy load requirements.

In another example, a transistor can be placed between every input terminal and each output terminal to replace the diode in the above example. The turn on and off of the transistor can be controlled by sequential logic, in order to execute the switching between different input voltages. This approach using transistors can lower system losses, but a time delay may be needed after the current transistor is completely turned off and before another transistor is turned on, for unidirectional conduction without any back flow current, in order to execute the switching between different voltages. Thus, during the switch operation, the output voltage may be smaller than the input voltage by a diode voltage drop, which may be far beyond the allowable range of some applications (e.g., a universal serial bus [USB] power delivery).

In another example, two transistors in the form of a pair-transistor can be placed between each input terminal and each output terminal. The body diodes of the two transistors can be coupled face-to-face (e.g., the anodes or the cathodes of two body diodes are coupled together). However, this approach may have drawbacks including that there may be a drop of the output voltage in the switching process. The magnitude of the drop value can be related to the size of the load, the size of the output capacitor, and the length of the dead time of the switching control signal of the transistor. The relatively small output capacitor may lead to an unacceptable switching voltage drop. In some applications, because of the limitation on the upper limit of the output capacitor, the switching voltage fluctuations may be greater.

In particular embodiments, a control method for a voltage switch circuit that includes switch circuits (e.g., two channels), where an input terminal of the first switch circuit can receive a first voltage, an input terminal of the second switch circuit can receive a second voltage, and output terminals of the first and second switch circuits can be coupled together as an output terminal of the voltage switch circuit for providing a output voltage. When the output voltage is to switch from the first to the second voltage, the voltage switch circuit can be controlled as follows. For example, at step 1, when the switch operation begins, before the second switch circuit is on, the output voltage can be controlled to be no greater than the smaller one of the first and second voltages, in order to prevent the current flowing from the output terminal back to the input terminal. At step 2, when the second switch circuit starts conducting, the output voltage can be switched to the second voltage. At step 3, the first switch circuit can be controlled to turn off after the second switch circuit starts conducting and when the output voltage is no larger than the smaller one of the first and second voltages. For example, "turn off" as used herein may indicate that the input terminal and the output terminal of the given switch circuit is disconnected.

When the switch operation is to occur, step 1 can be carried out to ensure that the output voltage will not be larger than the first and second voltages at the initial stage of the switch operation, in order to prevent the current of the voltage switch circuit from flowing back. Step 3 can be carried out to ensure that the first switch circuit is not completely turned off when the second switch circuit starts conducting, in order to realize seamless switching between the first and second switch circuits. This can also prevent the input terminals from being disconnected with the output terminals for a short time period during the switching process, and may avoid a relatively large voltage drop of the output voltage (e.g., to eliminate the effect of the load on the voltage drop). At step 3, the first switch circuit can be controlled to turn off when the output voltage is no larger than the smaller one of the first and second voltages, in order to prevent the current of the first switch circuit from flowing from the output terminal back to the input terminal.

In order to avoid the flow back current, at step 1, when the switch operation is to occur, the output voltage can be decreased, e.g., from the first voltage to a third voltage. For example, the first switch circuit may transition from a complete conducting state to an incomplete conducting state, and the conduction extent may be decreased over time in order to control the output voltage to decrease from the first to the third voltage. For example, the value of the third voltage may be equal to a difference between the smaller one of the first and second voltages and a predetermined voltage. The drop value of the output voltage can be controlled to be the predetermined voltage during a relatively short time period at the initial stage of the switch operation, in order to fully avoid the flow back current during the operation process. Because the drop value of the output voltage may be equal to the predetermined voltage, the predetermined voltage can be set to be relatively small. For example, the predetermined voltage may be substantially smaller than the conductive voltage drop of the diode. Thus, the drop value of the output voltage can be relatively small during the switching process.

At step 2, the second switch circuit can be soft-started. For example, the second switch circuit can be controlled to initially transition from an off state to an incomplete conducting state, and then to transition from the incomplete conducting state to a complete conducting state after the output voltage is decreased to the third voltage. Thus, the output voltage may gradually rise from the third voltage to the second voltage, instead of immediately linearly rising. Therefore, there can be a certain time period between the time when the second switch circuit starts conducting and the time when the output voltage equals the smaller one of the first and second voltages, in order for the first switch circuit to be turned off in such time period.

In particular embodiments, the voltage switch circuit can be controlled by two loops, including a first control loop and a second control loop. At step A, when the switch operation is to occur, the first switch circuit can be controlled to transition from the complete conducting state to the incomplete conducting state by the first control loop, such that the output voltage begins to decrease from the first voltage. At step B, after the output voltage is decreased to the third voltage from the first voltage, the second switch circuit can be controlled to conduct by the first control loop, such that the output voltage is raised to the second voltage. Also, the first switch circuit can be controlled to turn off by the second control loop before the output voltage is raised to the smaller one of the first and second voltages.

At step B, after the output voltage is decreased to the third voltage from the first voltage, and before the second switch circuit starts conducting, the second control loop can control the conduction state of the first switch circuit to remain unchanged, and the output voltage can be maintained at the third voltage until the second switch circuit starts conducting. After the second switch circuit is controlled to conduct by the first control loop, the second control loop can control the first switch circuit to transition from the incomplete conducting state to the off state, such that the first switch circuit is controlled to turn off before the output voltage is raised to the smaller one of the first and second voltages.

In one example control at step B, the second switch circuit can begin entering into the conduction state from the off state since the output voltage may be decreased to the third voltage for a while. In another example control at step B, the second switch circuits can begin entering into the incomplete conducting state from the off state immediately when the output voltage is decreased to the third voltage. When the output voltage is decreased to the third voltage from the first voltage, the first control loop can begin controlling the second switch circuit to transition from the off state to the incomplete conducting state. In addition, the second control loop can control the first switch circuit to transition from the incomplete conducting state to the off state. Thus, the first switch circuit can be turned off before the output voltage is raised to the smaller one of the first and second voltages.

Before the switch operation is performed (e.g., when the voltage is to be switched to the first voltage), the first switch circuit can be controlled by the first control loop. The first control loop can control the first switch circuit to transition from the off state to the incomplete conducting state, and may gradually transition from the incomplete conducting state to the complete conducting state. Thus, the output voltage can be maintained at the first voltage after being raised to the first voltage. In this way, current may be prevented from flowing back in the voltage switch circuit during the switching process, and may also substantially avoid relatively large drop voltages and power losses.

Referring now to FIG. 1, shown is a schematic block diagram of a first example voltage switch circuit, in accordance with embodiments of the present invention. In this particular example, the voltage switch circuit can include multi-channel switch circuit 1 and control circuit 2. Multi-channel switch circuit 1 can include N switch circuits (e.g., switch circuit 11, switch circuit 12, . . . switch circuit 1N). While generally two switch circuits and the switch operation therebetween are generally described herein, particular embodiments include any number of switch circuits. Each switch circuit can include a switching circuit, such as at least one transistor. Input terminals of N switch circuits can respectively receive input voltages VIN1, VIN2 . . . VINN, and output terminals of N switch circuits can be connected together as an output terminal of the voltage switch circuit, in order to provide output voltage VOUT. When the voltage switch circuit is used in a high voltage environment, the switching circuit can be implemented by two transistors that are series coupled in the form of face-to-face. For example, the sources or drains of two transistors can be coupled together. In this example, each switch circuit can include two series coupled transistors in the face-to-face form.

Switch circuit 11 can be formed by transistors Q1*a* and Q1*b* with drains coupled together, switch circuit 12 can be formed by transistors Q2*a* and Q2*b* with drains coupled together, and switch circuit 1N can be formed by transistors QN*a* and QN*b* with drains coupled together.

When the voltage switch circuit is used in a low voltage environment, each switch circuit can be implemented by a single transistor. In this particular example, the two switch circuits to be switched may respectively defined as the "first switch circuit" and the "second switch circuit." The input voltage of the first switch circuit can be defined as the "first voltage," which may equal output voltage VOUT before the switching process. The input voltage of the second switch circuit can be defined as the "second voltage," which may equal output voltage VOUT after the switching process. Also, the first switch circuit can be controlled by the first switch control signal (e.g., C1), and the second switch circuit can be controlled by the second switch control signal (e.g., C2).

Control circuit 2 can switch the output voltage of the voltage switch circuit between different input voltages, such as to switch the output voltage VOUT from voltage VIN1 to voltage VIN2. Control circuit 2 can include switch control signal generating circuit 21 and reference voltage generating circuit 22. When output voltage VOUT is to switch from voltage VIN1 to voltage VIN2, before switch circuit 12 starts conducting (e.g., before switch circuit 12 is not completely on), switch control signal generating circuit 21 can generate switch control signal C1 according to reference voltage Vref1 (e.g., generated by reference voltage generating circuit 22) and output voltage VOUT, to control switch circuit 11 (e.g., to control the turn on and off of the transistors in switch circuit 11). For example, switch control signal C1 can control when transistors Q1*a* and Q1*b* are to be fully on, when the transition from the complete conducting state to the incomplete conducting state can occur, and when the transition from the incomplete conducting state to the off state can occur. This can ensure that output voltage VOUT is no greater than reference voltage Vref2, and reference voltage Vref2 can equal the smaller one of voltages VIN1 and VIN2. Further, transistors Q1*a* and Q1*b* may have the same on/off states.

When output voltage VOUT is not larger than reference voltage Vref2, switch control signal generating circuit 21 can generate switch control signal C2 according to reference voltage Vref1 and output voltage VOUT, in order to control switch circuit 12 (e.g., to control the turn on and off of the transistors in switch circuit 12). For example, switch control signal C2 can control when transistors Q2*a* and Q2*b* are completely on, when the transition from the complete conducting state to the incomplete conducting state can occur, and when the transition from the incomplete conducting state to the off state can occur. Thus, output voltage VOUT may be switched to voltage VIN2, and maintained at voltage VIN2. Further, transistors Q2*a* and Q2*b* may have the same on/off states.

When switch control signal C2 is activated, switch control signal generating circuit 21 can generate switch control signal C1 according to reference voltage Vref2 and the output voltage VOUT, in order to control switch circuit 11 to turn off after switch circuit 12 begins conducting but does not completely conduct, and when output voltage VOUT is no larger than reference voltage Vref2. Reference voltage Vref1 can be generated by reference voltage generating circuit 22 according to output voltage VOUT and reference voltage Vref2. Reference voltage Vref1 may operate as a reference voltage of output voltage VOUT (e.g., output voltage VOUT changes with reference to reference voltage Vref1).

For example, reference voltage generating circuit 21 can generate reference signal Vref1 directly according to reference voltage Vref2. Alternatively, a signal may initially be generated by switch control signal generating circuit 21 according to reference voltage Vref2 and output voltage VOUT, and that signal can indicate if output voltage VOUT is not larger than reference voltage Vref2. Then, reference voltage Vref1 can be generated by reference voltage generating circuit 22 according to the signal and output voltage VOUT. Control circuit 2 may also include bleed circuit 23 coupled between the output terminal of output voltage VOUT and the reference ground. If the voltage switch circuit is performing the above switch operation in the no load condition, in order to ensure that output voltage VOUT is controlled to be no greater than the smaller one of voltages VIN1 and VIN2, bleed circuit 23 can be enabled to reduce output voltage VOUT.

The control circuit can also include logic control circuit 24 for receiving an user order signal "Order" that may be generated by a bus line (e.g., a control bus line). Logic control circuit 24 can provide a first group of order signals "Order1" to switch control signal generating circuit 21, to control switch control signal generating circuit 21 to perform a corresponding operation. For example, this can control whether switch control signal generating circuit 21 needs to perform the switch operation, and which channel is switched to another channel, such that the first group of order signals Order1 may include a plurality of operation control signals. In addition, logic control circuit 24 can provide a second group of order signals "Order2" to reference voltage generating circuit 22, so as to control whether reference voltage generating circuit 22 needs to perform the switch operation, and which channel is to be switched to another channel. Conduction control signal DISC provided to bleed circuit 23 may also be generated by logic control circuit 24.

When the switch operation (e.g., from VIN1 to VIN2) is to occur, the output voltage can be controlled to be no greater than the smaller one of voltages VIN1 and VIN2, and then the second switch circuit can begin conducting (e.g., transitions from the off state to the incomplete conducting state). The first switch circuit can be controlled to turn off after the second switch circuit starts conducting and when the output voltage is no larger than the smaller one of voltages VIN1 and VIN2, such that a seamless switching between the first and second switch circuits can be achieved. For example, before the first switch circuit is not completely turned off, the second switch circuit can already be conducting. Thus, the drop value of the output voltage can be controllable regardless of the load during switch operation, and potential flow back current may be prevented.

In order to make sure that the current is prevented from flowing back during the switch operation, when the switch operation begins but switch circuit 12 is not conducting, reference voltage generating circuit 22 can control reference voltage VOUT to decrease from a "fourth" voltage to a "third" voltage according to reference voltage Vref2 and output voltage VOUT. Thus, switch control signal C1 can decrease to control switch circuit 11 to transition from the complete conducting state to the incomplete conducting state. For example, switch control signal C1 can control transistors Q1*a* and Q1*b* to transition from the complete conducting state to the incomplete conducting state, and the conduction scope of transistors Q1*a* and Q1*b* may be reduced. Thus, output voltage VOUT can decrease from voltage VIN1 to the third voltage, which may be equal to the difference between the smaller one of voltages VIN1 and VIN2, reference voltage Vref2, and the predetermined voltage. Therefore, during the switch operation, output voltage VOUT can be controlled to drop a predetermined voltage, where the predetermined voltage may be set to be smaller than the conduction voltage drop of a diode (e.g., about 50 mV). As the output voltage is lower than the smaller one of voltages VIN1 and VIN2 by the predetermined voltage, the current may be prevented from flowing back.

In addition, in order to eliminate the effect on the subsequent switch operation caused by the previous switch operation, after the output voltage is decreased from voltage VIN1 to the third voltage, reference voltage Vref1 can be decreased from the third voltage to the initial voltage (e.g., the ground potential) and then increased such that switch control signal C2 accordingly rises. When reference voltage Vref1 reaches the third voltage, switch control signal C2 can control switch circuit 12 to begin conducting (e.g., to transition from the off state to the incomplete conducting state). Reference voltage Vref1 can continuously rise to the fifth voltage, and switch control signal C2 can continuously rise, in order to control switch circuit 12 to gradually transition from the incomplete conducting state to the complete conducting state.

Switch control signal C2 can control transistors Q2a and Q2b to transition from the incomplete conducting state to the complete conducting state, and the conduction scope may be decreased such that output voltage VOUT is switched to voltage VIN2. Before reference voltage Vref1 reaches the third voltage, switch control signal C1 may remain unchanged under the control of reference voltage Vref2, such the conduction state of switch circuit 11 can remain as is, and output voltage VOUT can be maintained at the third voltage. Switch control signal C1 can decrease under the control of reference voltage Vref2, in order to control switch circuit 11 to transition from the incomplete conducting state to the off state. For example, switch circuit 11 may gradually be turned off and finally completely turned off before output voltage VOUT reaches reference voltage Vref2.

In order to reduce the effect on the subsequent switch operation caused by the previous switch operation as well as to obtain a fast switching speed, when the switch operation is performed, reference voltage Vref1 may decrease from the fourth voltage to voltage VIN1, and then reference voltage Vref1 can decrease from voltage VIN1 to the third voltage before switch circuit 12 starts conducting. Thus, reference voltage Vref1 may immediately rise after being decreased to the third voltage, in order to control switch control signal C2 to immediately rise to the initial value when switch circuit 12 starts conducting. Thus, switch circuit 12 can begin conducting immediately when reference voltage Vref1 is decreased to the third voltage from voltage VIN1.

Reference voltage Vref1 can continuously rise to a "fifth" voltage and can control switch control signal C2 to continuously rise, such that that switch circuit 12 gradually transitions from the incomplete conducting state to the complete conducting state, and output voltage VOUT is switched to voltage VIN2. When switch circuit 1 begins conducting, switch control signal C1 can decrease under the control of reference voltage Vref2, in order to control the voltage drop of switch circuit 11 to increase. Switch circuit 11 can rapidly enter the off state, and thus switch circuit 11 can be turned off before the output voltage reaches reference voltage Vred2.

As the reference voltage of output voltage VOUT, during the period when output voltage VOUT is to maintain at voltage VIN1, the final stable value of reference voltage Vref1 may be equal to the fourth voltage (e.g., no less than voltage VIN1). After the switch operation is performed, and during the period when the output voltage VOUT is to maintain at voltage VIN2, the final stable value of reference voltage Vref1 may be equal to the fifth voltage (e.g., no less than voltage VIN2), such that output voltage VOUT can be successfully switched to the required voltage under the control of reference voltage Vref1. For example, the fourth voltage may be equal to voltage VIN1, and the fifth voltage can be equal to voltage VIN2. As another example, the fourth and fifth voltages may both be equal to the maximum value of input voltages VIN1, VIN2 . . . VINN.

In this particular example, before the switch operation is performed, output voltage VOUT may rise and be maintained at voltage VIN1 under the control of reference voltage Vref1. For example, reference voltage Vref1 may initially be raised to the fourth voltage and maintained at the fourth voltage, in order to control switch control signal C1 to remain unchanged after being raised. Thus, switch circuit 11 can be maintained at the complete conducting state after transitioning from the incomplete conducting state to the complete conducting state, and output voltage VOUT may remain at voltage VIN1 after being raised to voltage VIN1.

Figure 2:
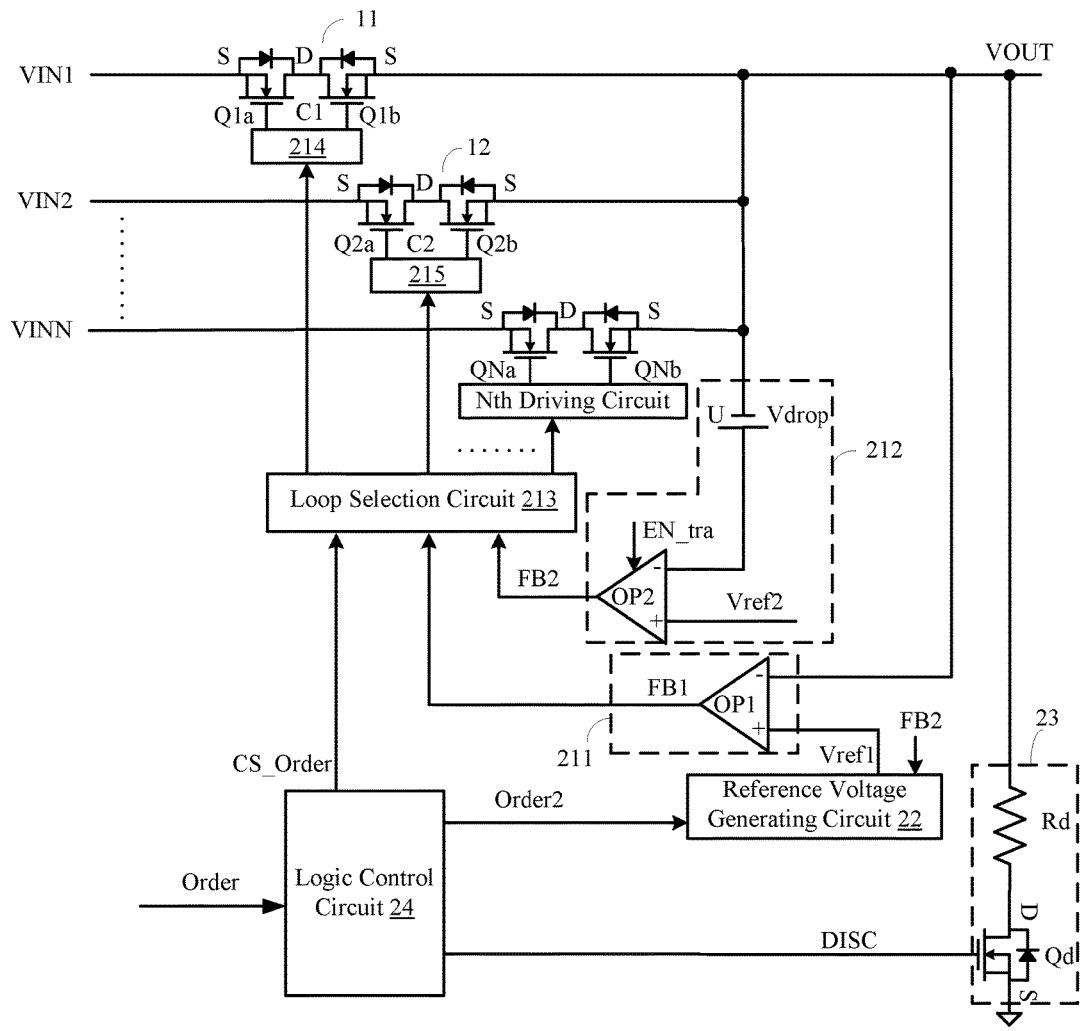
FIG. 2 is a schematic block diagram of a second example voltage switch circuit, in accordance with embodiments of the present invention.

Referring now to FIG. 2, shown is a schematic block diagram of a second example voltage switch circuit, in accordance with embodiments of the present invention. In this example, switch control signal generating circuit 21 (see, e.g., FIG. 1) can include feedback circuit 211, feedback circuit 212, loop selection circuit 213, driving circuit 214, and driving circuit 215. Feedback circuit 211 can generate feedback signal FB1 according to output voltage VOUT and reference voltage Vref1. Feedback circuit 212 can generate feedback signal FB2 according to output voltage VOUT and reference voltage Vref2 when the switch operation is to occur. Feedback signal FB2 can control reference voltage generating circuit 22, and may indicate if the voltage drop of output voltage VOUT reaches the predetermined voltage for reference voltage generating circuit 22. In this way, it can be determined if output voltage VOUT is decreased to the third voltage to control reference voltage generating circuit 22 to generate reference voltage Vref1.

When the switch operation is to occur, before switch circuit 12 starts conducting, the first group of orders Order1 can include channel selection signal CS_Order that may be provided to loop selection circuit 213 to indicate if the switch operation is to occur. Loop selection circuit 213 can select feedback signal FB1 to control driving circuit 214 to generate switch control signal C1, and may control output voltage VOUT to begin to decrease from voltage VIN1. After output voltage VOUT has decreased to the third voltage, loop selection circuit 213 can select feedback signal FB1 to control driving circuit 215 to generate switch control signal C2, and may select feedback signal FB2 to control driving circuit 214 to generate switch control signal C1. The first group of orders Order1 can also include switch enable signal EN_tra for controlling feedback circuit 212, in order to generate feedback signal FB2 when beginning the switch operation. Reference voltage generating circuit 22 and feedback circuit 211 may form the main part of the first control loop as described herein, and feedback circuit 212 may form the main part of the second control loop as described herein. Loop selection circuit 213 can control a corresponding switch circuit by selecting a control loop, in order to perform the switch operation.

Feedback circuit 211 can include an error amplifier (e.g., operational amplifier OP1) for generating an error amplification value (e.g., feedback signal FB1) of reference voltage Vref1 and output voltage VOUT. Feedback circuit 212 can include an error amplifier (e.g., an operational amplifier OP2) for providing an error amplification value (e.g., feedback signal FB2) of the third voltage (e.g., VINN) and output voltage VOUT. Feedback circuit 212 can also include predetermined voltage source U for generating predetermined voltage Vdrop. The positive pole of predetermined voltage source U can connect to the inverting terminal of error amplifier OP2, and the negative pole can connect to the output terminal of the output voltage VOUT. The non-inverting terminal of error amplifier OP2 can receive reference voltage Vref2. The inverting terminal of error amplifier OP2 can receive a sum voltage of output voltage VOUT and predetermined voltage Vdrop. In bleed circuit 23, resistor Rd and transistor Qd can connect in series between the output terminal of the voltage switch circuit and the reference ground, and transistor Qd may be controlled by signal DISC.

Figure 3:
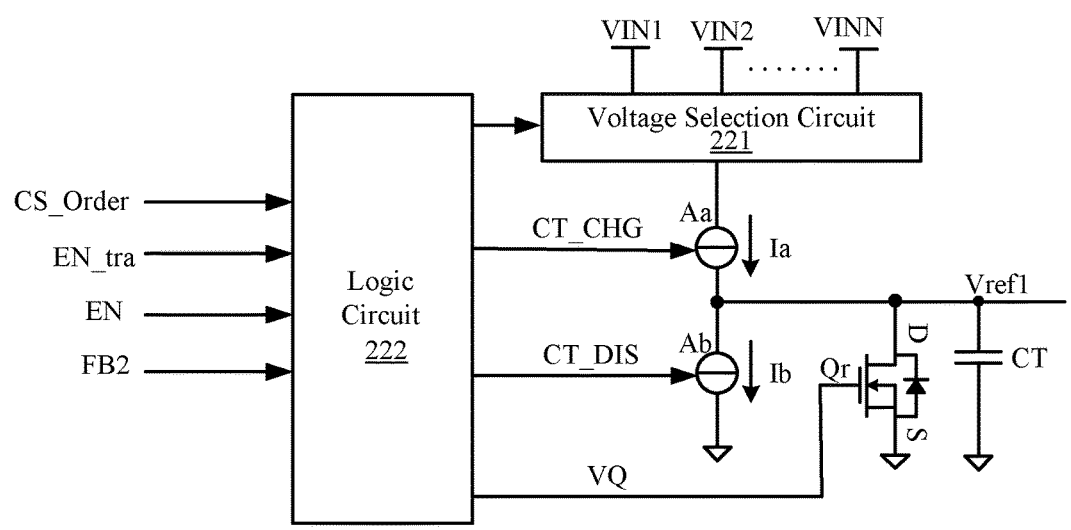
FIG. 3 is a schematic block diagram of a first example reference voltage generating circuit, in accordance with embodiments of the present invention.

Referring now to FIG. 3, shown is a schematic block diagram of a first example reference voltage generating circuit, in accordance with embodiments of the present invention. In this particular example, reference voltage generating circuit 22 can include an energy storage circuit, a discharge circuit, a charge circuit, and a reset circuit. When the switch operation is to occur, the energy storage circuit can be discharged via the discharge circuit, such that the voltage on the energy storage circuit may begin to decrease from the fourth voltage. The output voltage may also begin to decrease, and when the output voltage is decreased to the third voltage, the voltage on the energy storage circuit may also be decreased to the third voltage. The reset circuit can control the voltage on the energy storage circuit to decrease until reaching the initial voltage. The charge circuit may then charge the energy storage circuit, and the voltage on the energy storage circuit may be raised to the fifth voltage and further maintained at the fifth voltage as reference voltage Vref1. In this example, the energy storage circuit can include capacitor CT, the charge circuit can include current source Aa with output current Ia, the discharge circuit can include current source Ab with output current Ib, and the reset circuit can include transistor Qr.

The voltage generating circuit can include voltage selection circuit 221 and logic circuit 222. Voltage selection circuit 221 can select one of input voltages VIN1, VIN2 . . . VIN3 as a supply voltage of the charge circuit coupled with current source Aa. The output terminal of the current source Aa can connect to current source Ab, and a common node of the current sources can connect to the first terminal of capacitor CT. the second terminal of capacitor CT can connect to the reference ground, and transistor Qr can connect between the first terminal of capacitor CT and the reference ground. Logic circuit 222 can receive the second group of orders Order2. In this example, the second group of orders Order2 can include channel selection signal CS_Order, switch enable signal EN_tra, system enable signal EN, and feedback signal FB2. Logic circuit 222 can generate a voltage selection control signal, charge control signal CT_CHG, discharge control signal CT_DIS, and reset control signal VQ according to received signals.

Figure 4:
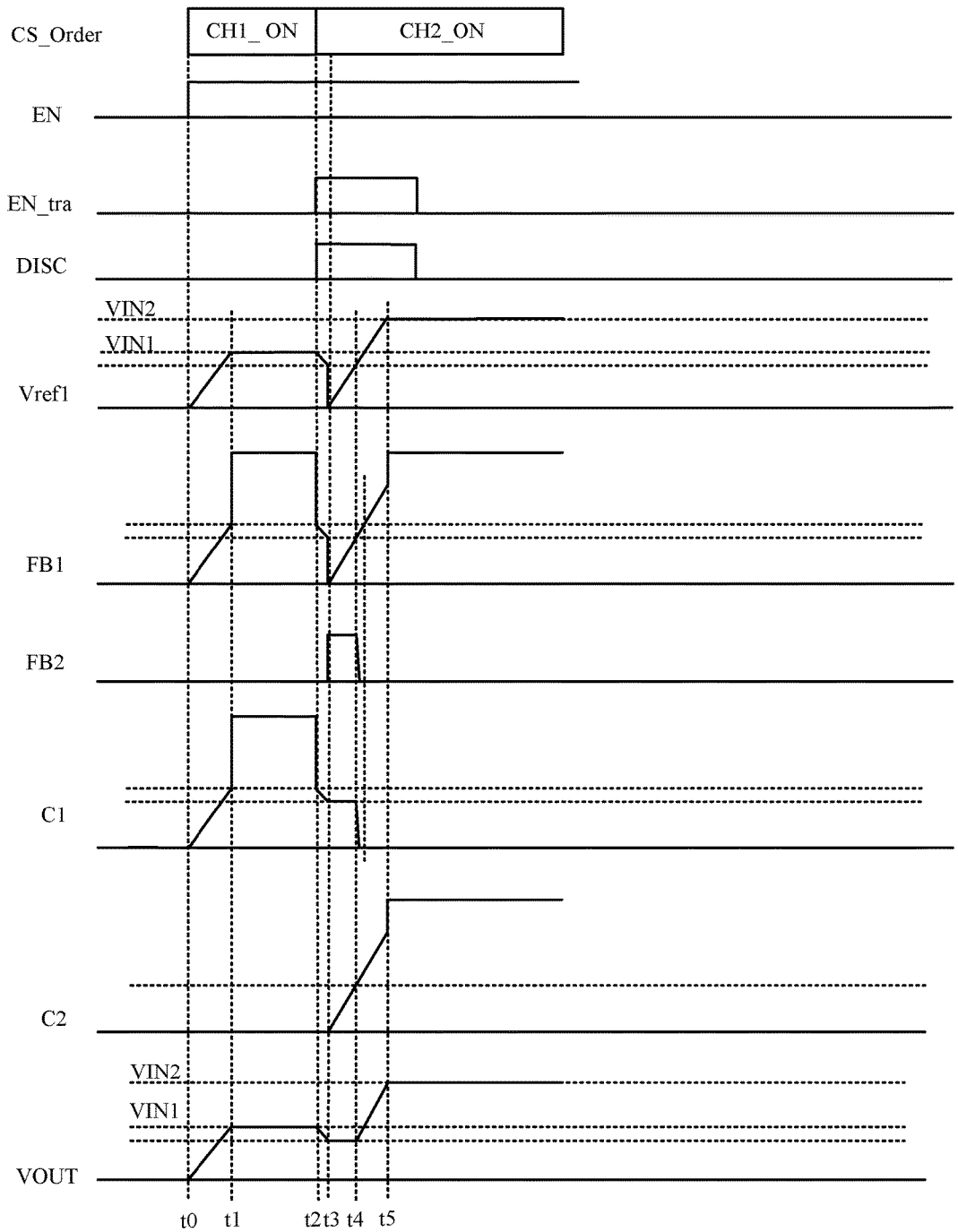
FIG. 4 is a waveform diagram of example operation of the voltage switch circuit of FIG. 2, in accordance with embodiments of the present invention.

Referring now to FIG. 4, shown is a waveform diagram of example operation of the voltage switch circuit of FIG. 2, in accordance with embodiments of the present invention. At time t0, when system enable signal EN is active, the voltage switch circuit can begin operating. Channel selection signal CS_Order can select channel CH1 that may correspond to switch circuit 11 to stay in CH1_ON state (e.g., the output voltage equals voltage VIN1). The energy storage circuit may activate charge control signal CT_CHG through logic circuit 222, and the output signal control voltage selection circuit can select a voltage that is no less than voltage VIN1 to be the fourth voltage (e.g., select voltage VIN1 as the fourth voltage). When charge control signal CT_CHG is active, current source Aa can charge capacitor CT such that voltage Vref1 on capacitor CT gradually rises. Feedback signal FB1 can begin rising, and switch control signal C1 may also begin rising, such that output voltage VOUT may be controlled to gradually rise. At time t1, reference voltage Vref1 can be raised to voltage VIN1 and maintained at voltage VIN1 before time t2. Both of feedback signal FB1 and switch control signal C1 can be raised to the maximum values at time t1, and maintained at the maximum values before time t2. For example, switch circuit 11 may completely conduct between time t1 and time t2, and output voltage VOUT can be maintained at voltage VIN1.

At time t2, the rising edge of switch enable signal EN_tra may arrive, and channel selection signal CS_Order can select channel CH2 as switch circuit 12 to remain in an CH2_ON state, which can indicate that output voltage VOUT is to switch from voltage VIN1 to voltage VIN2. Here, the voltage selection control signal can control voltage selection circuit 221 to select voltage VIN2. Charge control signal CT_CHG may be inactive, discharge control signal CT_DIS may be active, capacitor CT can be discharged by current source Ab, and reference voltage Vref1 may begin to decrease. Also, both of feedback signal FB1 and switch control signal C1 can begin decreasing, such that output voltage VOUT may begin to decrease from voltage VIN1.

At time t3, output voltage VOUT may decrease to the third voltage, reset control signal VQ may go active, transistor Qr can conduct, and reference voltage Vref1 may be immediately reset to zero. Feedback signal FB1 may also immediately be decreased to the minimum value. Then, CT_CHG can go active, current source Aa may charge capacitor CT, and reference voltage Vref1 can begin rising. At time t3, feedback signal FB2 may rapidly rise to the maximum value and may remain unchanged during the period from time t3 to time t4. Switch control signal C1 may remain unchanged during this period, and the output voltage can be maintained at the third voltage. At time t3, as reference voltage Vref1 starts rising, feedback signal FB1 can begin rising, and switch control signal C2 may also begin rising. When reference voltage Vref1 is raised to the third voltage, switch control signal C2 can control switch circuit 12 to start conducting, such that output voltage VOUT may begin rising. In addition, feedback signal FB2 may rapidly begin to decrease, such that switch control signal C1 can be decreased to the minimum value when the output voltage is raised to reference voltage Vref2 or before the output voltage is raised to reference voltage Vref2, in order to completely turn off switch circuit 11.

Reference voltage Vref1 and feedback signal FB1 may continue rising, and switch control signal C2 may also continue rising. After time t5, reference voltage Vref1 can be raised to voltage VIN2 and maintained at voltage VIN2. Feedback signal FB1 may also be raised to the maximum value and further maintained at the maximum value. Switch control signal C2 may also be raised to and maintained at the maximum value, such that output voltage VOUT can be raised to and maintained at voltage VIN2, in order to complete the switch operation. After time t6, output voltage VOUT can be switched to other voltages with reference to the above approach, or may gradually be decreased to zero. In addition, bleed control signal DISC and enable switch control signal EN_tra can facilitate such switching the no-load state.

Figure 5:
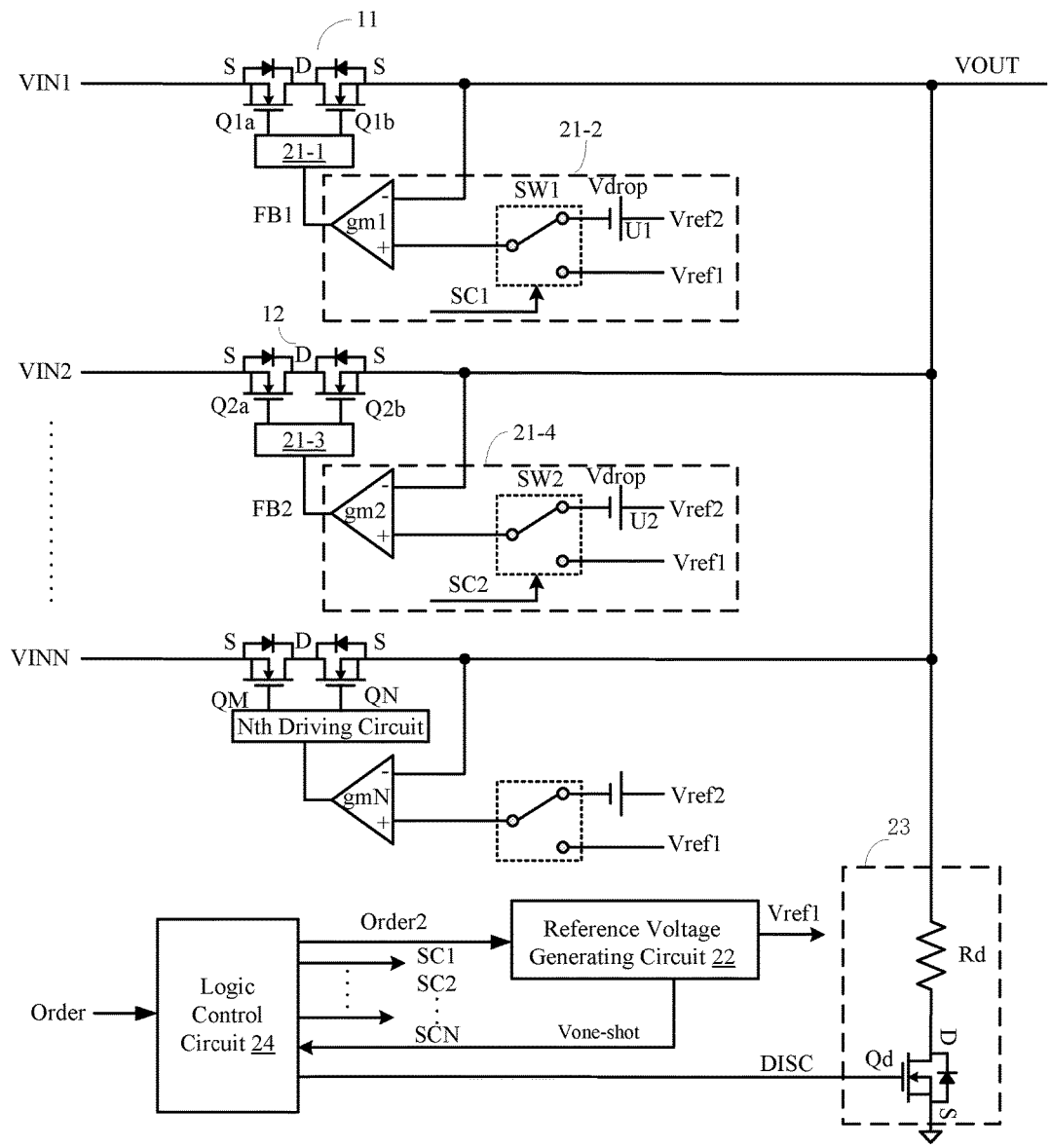
FIG. 5 is a schematic block diagram of a first example voltage switch circuit, in accordance with embodiments of the present invention.

Referring now to FIG. 5, shown is a schematic block diagram of a first example voltage switch circuit, in accordance with embodiments of the present invention. In this example, switch control signal generating circuit 21 can include N feedback circuits SW1, SW2 . . . SWN, and N driving circuits including driver 1, driver 2 . . . driver N. output terminals of N feedback circuits may respectively be coupled to input terminals of N driving circuits, and output terminals of N driving circuits may respectively be respectively coupled to the control terminals of N switch circuits, in order to output corresponding switch control signals of the corresponding switch circuits.

When the switch operation is to occur, reference voltage Vref1 generated by reference voltage generating circuit 22 may begin to decrease from reference voltage Vref1 according to the indication of the second group of orders Order2. Feedback signal FB1 generated by feedback circuit 21-2 may also decrease according to reference voltage Vref1 and output voltage VOUT, so as to control switch control signal C1 generated by driving circuit 21-1 to decrease. Thus, switch circuit 11 may gradually transition from the complete conducting state to the incomplete conducting state, and output voltage VOUT can begin to decrease from voltage VIN1. In order to speed up the switch operation, reference voltage Vref1 can immediately be pulled down to voltage VIN1 from the fourth voltage, and can further decrease from voltage VIN1. When reference voltage Vref1 is decreased to the third voltage, output voltage VOUT can decrease from voltage VIN1 to the third voltage, and reference voltage generating circuit 22 may generate trigger control signal Vone-shot to control logic control circuit 24 to output N selection signals SC1, SC2 . . . SCN, in order to control N feedback circuits.

When output voltage VOUT decreases to the third voltage, selection signal SC1 can control feedback circuit 21-2 to generate feedback signal FB1 according to reference voltage Vref2 and output voltage VOUT, in order to control driving signal C1 to decrease. Thus, switch circuit 11 may gradually transition from the incomplete conducting state to the off state (e.g., switch circuit 11 enters into the off state). Also, selection signal SC2 can begin controlling feedback circuit 21-3 to generate feedback signal FB2 according to reference voltage Vref1 and output voltage VOUT, in order to control feedback circuit 21-3 to generate switch control signal C2, and switch circuit 12 can accordingly begin conducting.

When output voltage VOUT is decreased to the third voltage, switch circuit 12 can begin conducting, then reference voltage Vref1, feedback signal FB2, and switch control signal C2 may accordingly increase. Thus, switch circuit 12 may gradually transition from the incomplete conducting state to the complete conducting state (e.g., circuit 12 gradually turns on), and output voltage VOUT can be switched to voltage VIN2 to complete the switch operation. Therefore, each switch circuit of the voltage switch circuit can be controlled by two loops. When selection signal SC1 is active, feedback circuit 21-2 can receive reference voltage Vref1. Reference voltage generating circuit 22, feedback circuit 21-2, and driving circuit 21-1 may form the first control loop. When selection signal SC1 is inactive, selection signal SC2 can be active. Thus, feedback circuit 21-2 can receive reference signal Vref2, and feedback circuit 21-4 can receive reference voltage Vref1. Reference voltage generating circuit 22, feedback circuit 21-4, and driving circuit 21-3 may form one control loop, and feedback circuit 21-2 and driving circuit 21-1 may form another control loop. Reference voltage Vref1 may be utilized as the control signal of one control loop, and reference voltage Vref2 may be utilized as the control signal of the other control loop.

Feedback circuit 21-2 can include an error amplifier (e.g., transconductance amplifier gm1) to output one of the error amplification value of reference voltage Vref1 and output voltage VOUT, and the error amplification value of the third voltage and output voltage VOUT, according to selection signal SC1. When the switch operation is to occur, error amplifier gm1 can output the error amplification value of reference voltage Vref1 and output voltage VOUT. When output voltage VOUT is decreased to the third voltage from voltage VIN1, error amplifier gm1 can output the error amplification value of the third voltage and output voltage VOUT. Feedback circuit 21-4 can include an error amplifier (e.g., transconductance amplifier gm2) to output the error amplification value of reference voltage Vref1 and output voltage VOUT when selection signal SC2 is active (e.g., output voltage VOUT is decreased to the third voltage).

In this particular example, feedback circuit 21-2 can also include selection circuit SW1 and predetermined voltage source U1. Feedback circuit 21-4 can also include selection circuit SW2 and predetermined voltage source U2. For example, predetermined voltage source U1 may provide predetermined voltage Vdrop, and predetermined voltage source U2 is may also provide predetermined voltage Vdrop. Error amplifier gm1 may have a non-inverting terminal coupled to the output terminal of selection circuit SW1, and an inverting terminal for receiving output voltage VOUT. Selection circuit SW1 may have a first input terminal coupled to the negative pole of predetermined voltage source U1, and a second input terminal for receiving reference voltage Vref1. The positive pole of predetermined voltage source U1 can receive reference voltage Vref2. Error amplifier gm1 may have a non-inverting terminal coupled to the output terminal of selection circuit SW2, and an inverting terminal for receiving output voltage VOUT. Selection circuit SW2 may have a first input terminal coupled to the negative pole of predetermined voltage source U2, and a second input terminal for receiving reference voltage Vref1. The positive pole of predetermined voltage source U2 can receive reference voltage Vref2.

Figure 6:
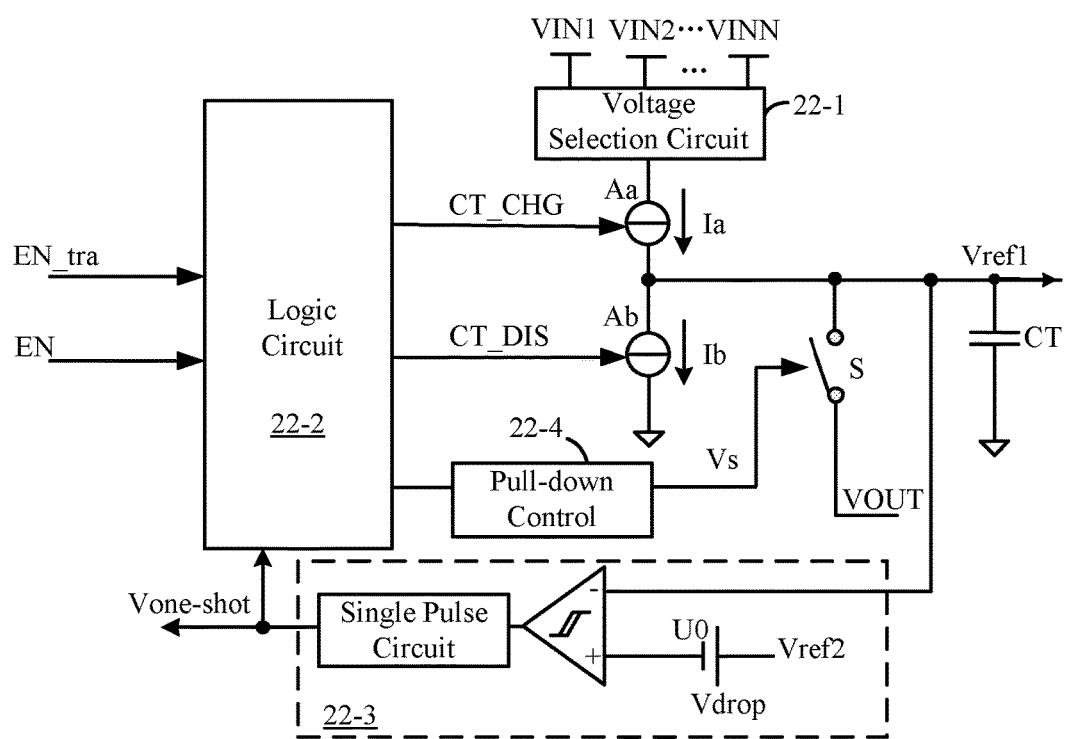
FIG. 6 is a schematic block diagram of a second example reference voltage generating circuit, in accordance with embodiments of the present invention.

Referring now to FIG. 6, shown is a schematic block diagram of a second example reference voltage generating circuit, in accordance with embodiments of the present invention. In this example, reference voltage generating circuit 22 can include an energy storage circuit, a discharge circuit, a charge circuit, and a pull-down circuit. When the switch operation is to occur, the voltage on the energy storage circuit (e.g., reference voltage Vref1) can decrease from the fourth voltage to voltage VIN1 in the function of the pull-down circuit. Then, the energy storage circuit may be discharged through the discharge circuit. Reference voltage Vref1 can begin to decrease from voltage VIN1, and output voltage VOUT may also begin to decrease. When output voltage VOUT is decreased to the third voltage, reference voltage Vref1 may also be decreased to the third voltage. In addition, the charge circuit can charge the energy storage circuit such that reference voltage Vref1 may increase from the third voltage to the fifth voltage and be maintained at the fifth voltage.

In this example, the energy storage circuit can include capacitor CT, the charge circuit can include current source Aa with output current Ia, the discharge circuit can include current source Ab with output current Ib, and the pull-down circuit can include transistor S. The voltage generating circuit can also include voltage selection circuit 22-1, logic circuit 22-2, trigger control generating circuit 22-3, and pull-down control circuit 22-4, for generating trigger control signal Vone-shot. Voltage selection circuit 22-1 can select one of input voltages VIN1, VIN2 . . . VINN as the supply voltage of the charge circuit to couple with current source Aa. In this example, voltage selection circuit 22-1 can select the maximum one of input voltages VIN1, VIN2 . . . VINN to couple with current source Aa (e.g., both of the fourth voltage and the fifth voltage are the maximum one of the input voltages VIN1, VIN2 . . . VINN). The output terminal of current source Aa can connect with current source Ab, a common node of the current sources can connect to the first terminal of capacitor CT, and the second terminal of capacitor CT can connect to the reference ground. Transistor/switch S can connect between the first terminal of capacitor CT and the output terminal of the voltage switch circuit (e.g., the terminal for outputting output voltage VOUT).

Logic circuit 22-2 can receive the second group of orders Order2. In this example, the second group of orders Order2 can include channel selection signal CS_Order, switch enable signal EN_tra, system enable signal EN, and trigger control signal Vone-shot. Logic circuit 22-2 can generate charge control signal CT_CHG and discharge control signal CT_DIS according to received signals. Trigger control generating circuit 22-3 may activate a short pulse signal (e.g., trigger control signal Vone-shot) when output voltage VOUT is decreased to the third voltage.

Trigger control generating circuit 22-3 can include predetermined voltage source U0 for generating predetermined voltage Vdrop, a Schmidt comparator, and a single pulse circuit. The Schmidt comparator may have an inverting terminal for receiving output voltage VOUT, a non-inverting terminal coupled to the negative pole of predetermined voltage source U0, and an output terminal coupled to the input terminal of the single pulse circuit. The positive pole of predetermined voltage source U0 can receive reference voltage Vref2, and the output terminal of single pulse circuit can generate trigger control signal Vone-shot. Pull-down control circuit 22-4 can include a single pulse circuit that is controlled by logic circuit 22-2, in order to generate pull-down control signal Vs. When the rising edge of switch enable signal EN_tra arrives, pull-down control signal Vs can be triggered to control transistor S to conduct for a short time (e.g., a pulse).

Figure 7:
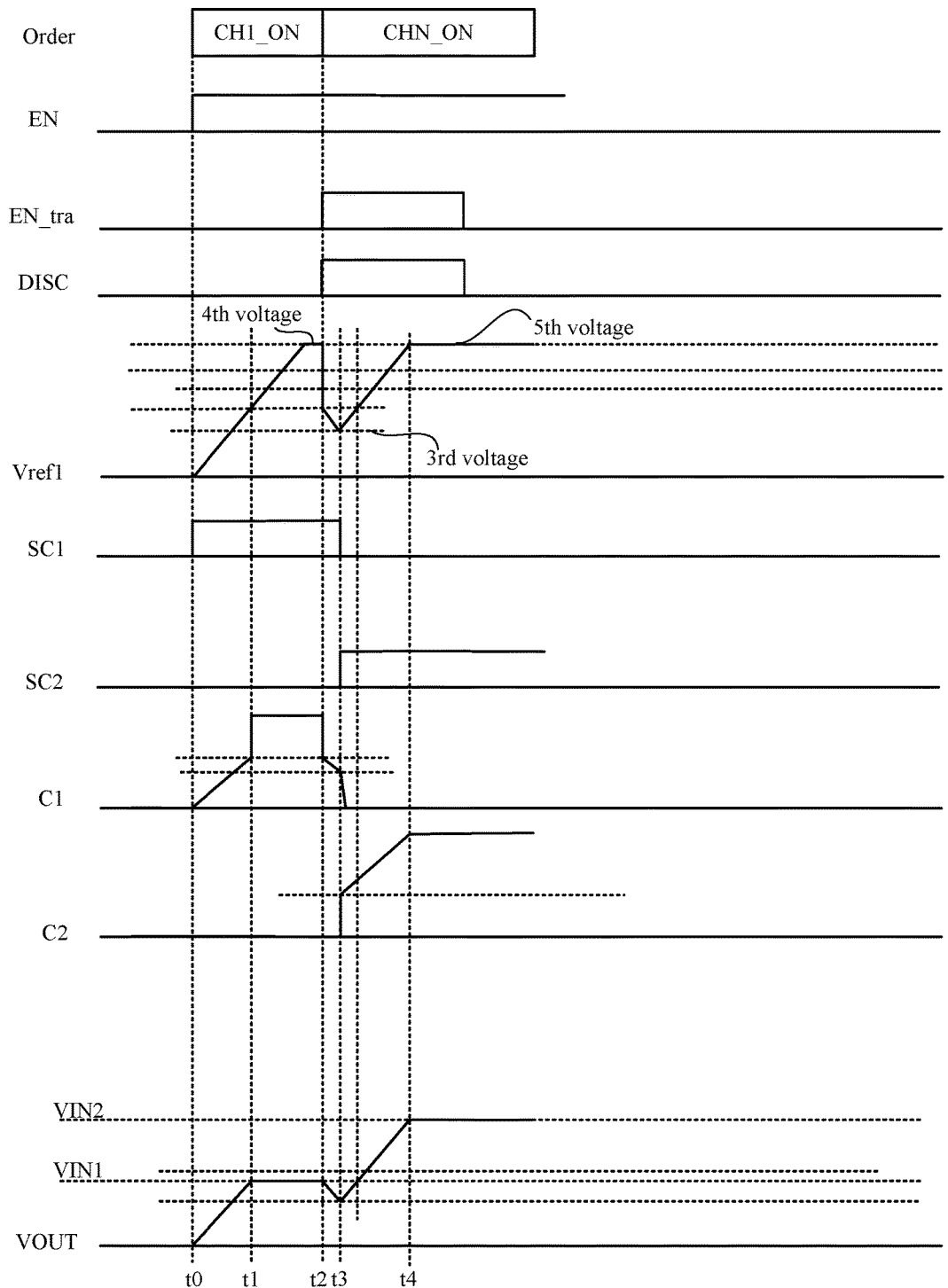
FIG. 7 is a waveform diagram of example operation of the voltage switch circuit of FIG. 5, in accordance with embodiments of the present invention.

Referring now to FIG. 7, shown is a waveform diagram of example operation of the voltage switch circuit of FIG. 5, in accordance with embodiments of the present invention. At time t0, when system enable signal EN is active, the voltage switch circuit can begin operating. Channel selection signal CS_Order can select channel CH1 that corresponds to switch circuit 11 to stay in the CH1_ON state (e.g., the output voltage equals voltage VIN1). Selection signal SC1 can be active, and feedback circuit 21-2 may generate feedback signal FB1 according to reference voltage Vref1 and output voltage VOUT, in order to control driving circuit 21-1, and to generate switch control signal C1.

From time t0 to time t1, the energy storage device may activate charge control signal CT_CHG by logic circuit 22-2. Source Aa can charge capacitor CT, such that voltage Vref1 on capacitor CT gradually rises. Feedback signal FB1 may begin rising, switch control signal C1 may also begin rising, and thus control output voltage VOUT can begin rising. At time t1, switch control signal C1 may reach the maximum value and remain unchanged during the period from t1 to t2. Thus, switch circuit 1 may be fully on during this period. Output voltage VOUT can increase to voltage VIN1 at time t1 and be maintained at voltage VIN1 during the period from time t1 to t2. From time t1 to time t2, reference voltage Vref1 can continue rising until reaching the fourth voltage, and then be maintained at the fourth voltage.

At time t2, the rising edge of switch enable signal EN_tra may arrive. Channel selection signal CS_Order can select channel CH2 as switch circuit 12 to remain in the CH2_ON state, which indicates that output voltage VOUT is to switch from voltage VIN1 to voltage VIN2. In addition, pull-down control signal Vs (e.g., the short pulse signal) can be activated, and transistor S may be turned on such that reference voltage Vref1 is immediately pulled down to voltage VIN. Then, pull-down control signal Vs can be deactivated. From time t2, charge control signal CT_CHG may be inactive, discharge control signal CT_DIS can be active, and capacitor CT may be discharged by current source Ab. Reference voltage Vref1 can begin to decrease from voltage VIN1, and switch control signal C1 may also begin to decrease, such that output voltage VOUT begins to decrease from voltage VIN1.

At time t3, output voltage VOUT can be decreased to the third voltage, and trigger control signal Vone-shot may go active. Thus, selection signal SC1 can be controlled to be inactive, and selection signal SC2 can go active. Charge control signal CT_CHG generated by logic circuit 22-2 can go active, and current source Aa may charge capacitor CT. reference voltage Vref1 may begin rising, and switch control signal C2 can also begin rising, such that switch circuit 12 starts conducting at time t3, and output voltage VOUT also can begin rising. From time t3, feedback circuit 21-2 can begin generating feedback signal FB1 according to output voltage VOUT and reference voltage Vref2. Since output voltage VOUT is smaller than reference voltage Vref2, switch control signal C1 may begin to rapidly decrease, in order to control switch circuit 11 to be completely turned off before output voltage VOUT is raised to reference voltage Vref1.

After time t3, reference voltage Vref1 may continue rising and ultimately reach the fifth voltage. Reference voltage Vref1 can then be maintained at the fifth voltage. Output voltage VOUT can be raised to voltage VIN2 at time t4. Here, switch circuit 12 may be fully on and be maintained at voltage VIN2 during the period of CH2_ON, in order to complete the switch operation. Output voltage VOUT can be switched to other voltages as described above, or can be gradually decreased to zero. In addition, in order to ensure that the voltage switch circuit is capable of achieving a rising switch in the no-load state, bleed control signal DISC and enable switch control signal EN_tra can be in the same state.

Also in particular embodiments, a USB power delivery (USBPD) can include a voltage switch circuit as described herein. Because the voltage switch circuit can achieve seamless switching, current can be substantially prevented from flowing back, and the power consumption is relatively low, such a USBPD device may not be easily damaged and have a longer service life than other approaches. The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method, comprising:
   a) controlling an output voltage of a voltage switch circuit having first and second switch circuits to be switched from a first voltage that is received by said first switch circuit to a second voltage that is received by said second switch circuit, and to be no larger than a smaller one of said first and second voltages before said second switch circuit starts conducting;
   b) switching said output voltage to said second voltage when said second switch circuit starts conducting, wherein outputs of said first and second switch circuits are coupled together to provide said output voltage;
   c) controlling said first switch circuit to turn off after said second switch circuit conducts and when said output voltage is no larger than said smaller one of said first and second voltages;
   d) controlling said first switch circuit to transition from a complete conducting state to an incomplete conducting state before said second switch circuit starts conducting; and
   e) controlling said output voltage to decrease from said first voltage to a third voltage, wherein a value of said third voltage is equal to a difference between said smaller one of said first and second voltages and a predetermined voltage.

2. The method of claim 1, further comprising:
   a) controlling said second switch circuit to transition from an off state to an incomplete conducting state and then to transition from said incomplete conducting state to a complete conducting state after said output voltage is decreased to said third voltage; and
   b) controlling said output voltage to gradually rise from said third voltage to said second voltage.

3. The method of claim 1, further comprising:
   a) controlling said first switch circuit to transition from said complete conducting state to said incomplete conducting state by a first control loop;
   b) controlling said second switch circuit to transition from said off state to said incomplete conducting state and then to transition from said incomplete conducting state to said complete conducting state by said first control loop after said output voltage is decreased to said third voltage from said first voltage; and
   c) increasing said output voltage said second voltage, and controlling said first switch circuit to turn off by a second control loop when said output voltage is raised to said smaller one of said first and second voltages.

4. The method of claim 3, further comprising:
   a) maintaining said first switch circuit at a conducting state by said second control loop after said output voltage is decreased to said third voltage from said first voltage and before said second switch circuit starts conducting, wherein said output voltage is maintained at said third voltage;
   b) controlling said first switch circuit to gradually transition from said incomplete conducting state to said off state by said second control loop after said second switch circuit conducts by said first control loop; and
   c) controlling said first switch circuit to turn off before said output voltage is raised to said smaller one of said first and second voltages.

5. The method of claim 3, further comprising:
   a) controlling said first switch circuit to transition from said off state to said incomplete conducting state and then to transition from said incomplete conducting state to said complete conducting state by said first control loop; and
   b) controlling said output voltage to remain at said first voltage after being gradually raised to said first voltage.

6. A control circuit, comprising:
   a) a voltage switch circuit having first and second switch circuits and an output voltage to be switched from a first voltage that is received by said first switch circuit to a second voltage that is received by said second switch circuit, wherein outputs of said first and second switch circuits are coupled together to provide said output voltage;
   b) a switch control signal generating circuit configured to generate a first switch control signal according to a first reference voltage and said output voltage to control said first switch circuit before said second switch circuit starts conducting, wherein said output voltage is no greater than a second reference voltage, and said second reference voltage equals a smaller one of said first and second voltages;
   c) said switch control signal generating circuit being configured to generate a second switch control signal according to said first reference voltage and said output voltage to control said second switch circuit to switch said voltage switch circuit to said second voltage, and
   d) said switch control signal generating circuit being configured to generate said first switch control signal according to said second reference voltage and said output voltage when said second switch control signal is generated, in order to control said first switch circuit to turn off after said second switch circuit conducts and when said output voltage is no larger than said second reference voltage; and
   e) a first reference voltage generating circuit configured to generate said first reference voltage according to said output voltage and said second reference voltage, wherein said first reference voltage is configured as a reference voltage of said output voltage.

7. The control circuit of claim 6, wherein:
   a) said first reference voltage is decreased from a fourth voltage to a third voltage before said second switch circuit starts conducting; and
   b) said first switch control signal is decreased to control said first switch circuit to transition from a complete conducting state to an incomplete conducting state in order to enable said output voltage to decrease from said first voltage to said third voltage, wherein a value of said third voltage equals a difference between said second reference voltage and a predetermined voltage.

8. The control circuit of claim 7, wherein:
   a) said first reference voltage is decreased from said third voltage to an initial voltage and then said first reference voltage and said second switch control signal rise;
   b) said second switch control signal controls said second switch circuit to begin entering said incomplete conducting state from said off state when said first reference voltage is raised to said third voltage;
   c) said first reference voltage continues to rise to a fifth voltage, and said second switch control signal also continues to rise, in order to control said second switch circuit to gradually transition from said incomplete conducting state to said complete conducting state, such that said output voltage is switched to said second voltage;
   d) before said first reference voltage is raised to said third voltage, said first switch control signal remains unchanged under the control of said second reference signal, in order to maintain the conduction state of said first switch circuit unchanged, such that said switch circuit is maintained at said third voltage; and e) said first switch control signal decreases under the control of said second reference signal, to control said first switch circuit to gradually transition from said incomplete conducting state to said off state, such that said first switch circuit is turned off before said output voltage is raised to said second reference voltage.

9. The control circuit of claim 6, wherein:
a) said first reference voltage is decreased from said first voltage to said third voltage before said second switch circuit enters into said incomplete conducting state from said off state,
b) said first reference voltage begins rising after being decreased to said third voltage, in order to control said second switch control signal to begin rising, such that said second switch circuit enters into said incomplete conducting state from said off state when said first reference voltage starts rising;
c) said first reference voltage continues to rise to said fifth voltage, and said second switch control signal is controlled to continuously rise, such that said second switch circuit gradually transitions from said incomplete conducting state to said complete conducting state, and said output voltage is switched to said second voltage; and
d) when said second switch circuit starts conducting, said first switch control signal decreases under the control of said second reference voltage, in order to control said first switch circuit to gradually transition from said incomplete conducting state to said off state, such that said first switch circuit is turned off before said output voltage is raised to said second reference voltage.

10. The control circuit of claim 6, wherein said first reference voltage is raised to said fourth voltage and is then maintained at said fourth voltage, in order to control said first switch control signal to rise and then be maintained as unchanged to maintain said conduction state of said first switch circuit as unchanged, and wherein said output voltage is maintained at said first voltage after being raised to said first voltage.

11. The control circuit of claim 7, wherein said switch control signal generating circuit comprises:
a) a first feedback circuit configured to generate a first feedback signal according to said output voltage and said first reference voltage;
b) a second feedback circuit configured to generate a second feedback signal according to said output voltage and said second reference voltage;
c) a loop selection circuit configured to select, before said second switch circuit starts conducting, said first feedback signal to control said first driving circuit to generate said first switch control signal, wherein said output voltage is controlled to decrease from said first voltage; and
d) said loop selection circuit being configured to select, after said output voltage is decreased to said third voltage, said second feedback signal to control a first driving circuit to generate said first switch control signal, and said first feedback signal to control a second driving circuit to generate said second switch control signal.

12. The control circuit of claim 11, wherein said first feedback circuit comprises:
a) a first error amplifier configured to output an error amplification value of said first reference voltage and said output voltage; and
b) a second error amplifier configured to output an error amplification value of said third voltage and said output voltage.

13. The control circuit of claim 12, wherein said second feedback circuit comprises a predetermined voltage source for generating said predetermined voltage, wherein a positive pole of said predetermined voltage source is coupled to an inverting terminal of said second error amplifier, a negative pole of said predetermined voltage source is coupled to said output voltage, and a non-inverting terminal of said second error amplifier is configured to receive said second reference voltage.

14. The control circuit of claim 7, wherein said first reference voltage generating circuit comprises:
a) an energy storage circuit configured to be discharged by said discharging circuit, such that a voltage on said energy storage circuit begins to decrease from said fourth voltage, and said output voltage begins to decrease;
b) a reset circuit configured, when said output voltage is decreased to said third voltage, and said voltage on said energy storage circuit is decreased to said third voltage, to control said voltage on said energy storage circuit to decrease to an initial voltage; and
c) a charging circuit configured to charge said energy storage circuit, wherein said voltage on said energy storage circuit is maintained at said fifth voltage after being raised to said fifth voltage, wherein said voltage on said energy storage circuit is configured as said first reference voltage.

* * * * *